United States Patent [19]

Lama et al.

[11] Patent Number: 4,903,074
[45] Date of Patent: Feb. 20, 1990

[54] PLURAL BELT DOCUMENT FEEDER WITH OPTIMUM OPTICAL PROPERTIES

[75] Inventors: William L. Lama, Webster; Robert P. Loce, Rochester; Martin Pepe, Jr., West Henrietta; Eleanor Whitte, Rochester; Robert P. Siegel, Penfield; Antje B. Parker, Sodus Center, all of N.Y.; Peter Watson, Stevenage Herts, England

[73] Assignee: Xerox Corporation, Stamford, Conn.

[21] Appl. No.: 336,992

[22] Filed: Apr. 12, 1989

[51] Int. Cl.$^4$ .............................................. G03B 27/64
[52] U.S. Cl. ...................................... 355/76; 355/312; 271/245
[58] Field of Search ...................... 355/76, 75, 91, 308, 355/312; 271/245, 276, 227

[56] References Cited

U.S. PATENT DOCUMENTS

| | | | |
|---|---|---|---|
| 4,008,956 | 2/1977 | Stemmle | 355/76 X |
| 4,294,540 | 10/1981 | Thettu | 355/76 |
| 4,412,738 | 11/1983 | Ahern et al. | 355/76 |
| 4,589,652 | 5/1986 | Silverberg | 271/245 |
| 4,618,138 | 10/1986 | Silverberg | 355/312 |
| 4,825,255 | 4/1989 | Iaia, Jr. et al. | 355/76 |

Primary Examiner—L. T. Hix
Assistant Examiner—D. Rutledge

[57] ABSTRACT

A document feeder is provided for presenting documents to the platen of a copier for copying with a vacuum belt platen transport system having document transporting belts movable under a substantially planar vaccum plenum backing. Also included is a vacuum system for applying a partial vacuum to a document sheet being transported by the movable belts over the platen. Show-through and show-around problems are reduced by optically mtching the belts and the plenum backing. In the preferred embodiment, the background surface is slightly roughend and made to be approximately 92% reflective to light during image exposure. The belts are composed of a urethane material which is approximately 16% transmissive but provides a 91% reflectance when moving along the plenum surface.

3 Claims, 4 Drawing Sheets

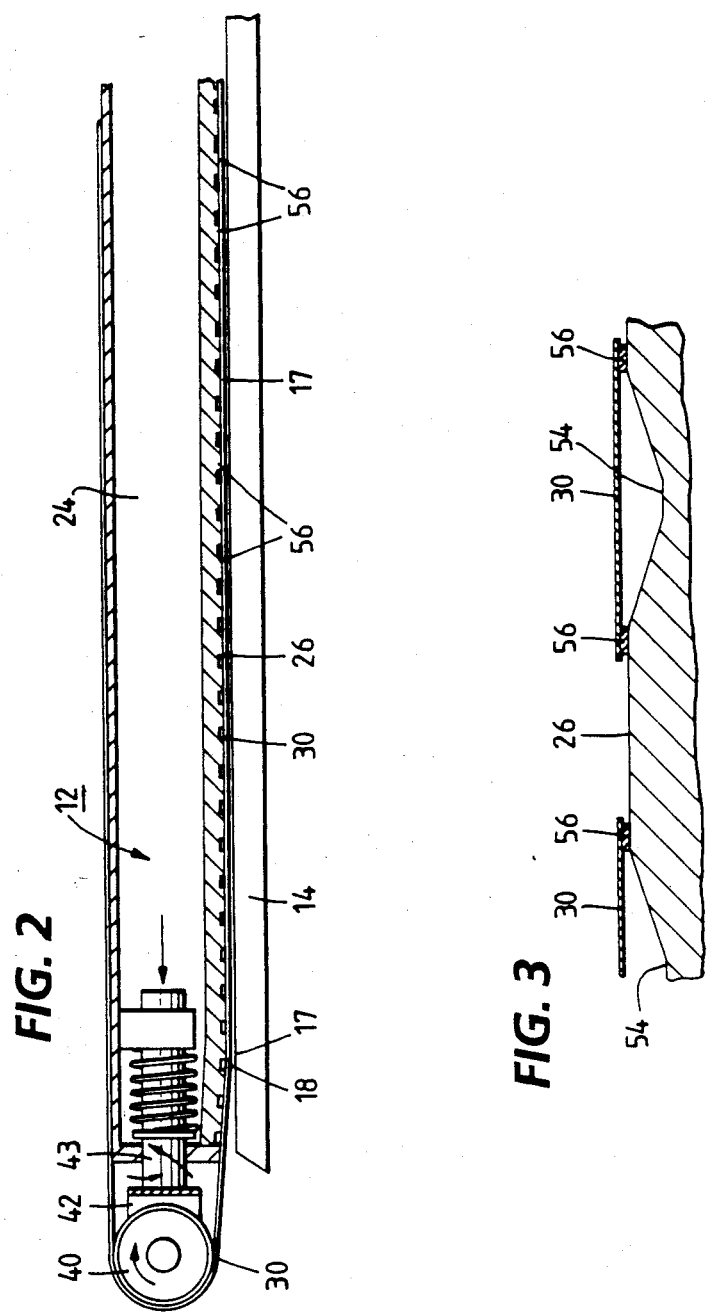

PLURAL BELT DOCUMENT FEEDER WITH OPTIMUM OPTICAL PROPERTIES

BACKGROUND AND PRIOR ART STATEMENT

The present invention relates to a document handler for a copier and more particularly to an improved document handler utilizing a plurality of low friction unapertured belts in a vacuum transport system, where the improvement relates to the optimization of the optical properties of the document handler.

A particular problem with modern copiers with short conjugate optics is maintaining the document being copied sufficiently flat on the imaging platen to avoid optical distortion and to maintain all of the document in focus. This is particularly difficult to achieve while maintaining positional control over the document, especially when rapidly replacing the document with another document to be copied. An efficient means for copying documents in this type of system is a multi-belt vacuum document transport system. An illustrative example of such a system is disclosed in U.S. Pat. No. 4,294,540 issued on Oct. 13, 1981 and assigned to Xerox Corporation. This patent discloses a vacuum belt platen transport system which comprises plural belts moving under a white vacuum plenum backing surface overlying the platen and includes a vacuum source for applying a partial vacuum to a document sheet being transported by the moving belts. Other patents disclosing plural belts in a vacuum transport system are U.S. Pat. No. 4,412,738 issued on Nov. 1, 1983 to Ahern et al. and U.S. Pat. No. 4,589,652 issued on May 20, 1986 to Silverberg.

These multiple belt transports are subject to copy defect problems which can be described as "show-around" and "show-through". "Show-through" is the printing out of dark areas on the copy sheet because the copier optics "sees" dark areas on the document transport through the document, particularly through a transparent or very thin or otherwise translucent document. "Show-around" can occur when the document is mis-registered, or a reduction copy is being made, which results in areas of the platen transport beyond (outside of) one or more edges of the original being directly imaged onto the copy. Both of these types of copy defects are more prevalent with vacuum platen transports and plural belt platen transports, because the belt edges and vacuum apertures tend to have both printable edge shadows and dirt contamination (visible darkening), particularly if such belts are of a relatively thick or high friction elastometric material. This can produce very undesirable dark areas on the copy sheets.

The present invention is directed towards a plural belt document feeder whose various components have been optimized to reduce or eliminate "show-through" and "show-around" problems. The reflectance and optical characteristics of the belt were analyzed and balanced against the reflectivity and surface texture of the plenum to arrive at an optimum balance of all these factors for a wide range of papers. More particularly the invention is directed towards the optimum optical properties of the document feeder which conveys document sheets into and away from an imaging position on a platen of a copier, including a vacuum belt transport system which comprises:

a plurality of spaced-apart belts moving between a plenum having a white backing surface and the platen, and a vacuum source for applying a partial vacuum to the inter-belt gaps to hold a document sheet against said belts so that the document is conveyed with the movement of the belts, characterized in that the plenum backing surface has a reflectance of approximately 92%, an average surface roughness of approximately 3.6 microns and said belts when backed by the plenum, have a reflectance of approximately 91%.

BRIEF DESCRIPTION OF THE DRAWINGS

FIG. 2 is a cross-sectional view taken along the line 2—2 of FIG. 1, exaggerated in the depth dimension;

FIG. 3 is an enlarged cross-section on line 3—3 of FIG. 1.

With reference to FIGS. 1 and 2 there is shown a vacuum belt transport system 12 of a document feeder for sequentially transporting document sheets over the imaging station of a platen 14 of a copier. The platen transport system 12 is adapted to register each document sheet 17 at a registration position 18 on the platen 14. The vacuum belt transport system 12 includes a vacuum plenum or manifold 24 having a white backing or imaging surface 26 closely overlying the platen 14. The plenum backing surface 26 is in turn closely overlaid with a plurality of transport belts 30 approximately 28 mm wide. The belts 30 are spaced-apart by gaps approximately 13 mm wide. The belts 30 are held spaced-apart from the major portion of the backing surface 26 by protrusions 56 provided at intervals on the backing surface, as discussed in more detail below. The belts 30 are each narrow, endless loops of white, substantially opaque, low frictional, non-elastomeric, plastic. They are preferably much less than 0.5 mm thick and a thickness of only approximately 0.2 mm had been found to be operative and desirable. The preferred belts 30 have a coefficient of friction of approximately 0.2 against paper.

Figure 1:
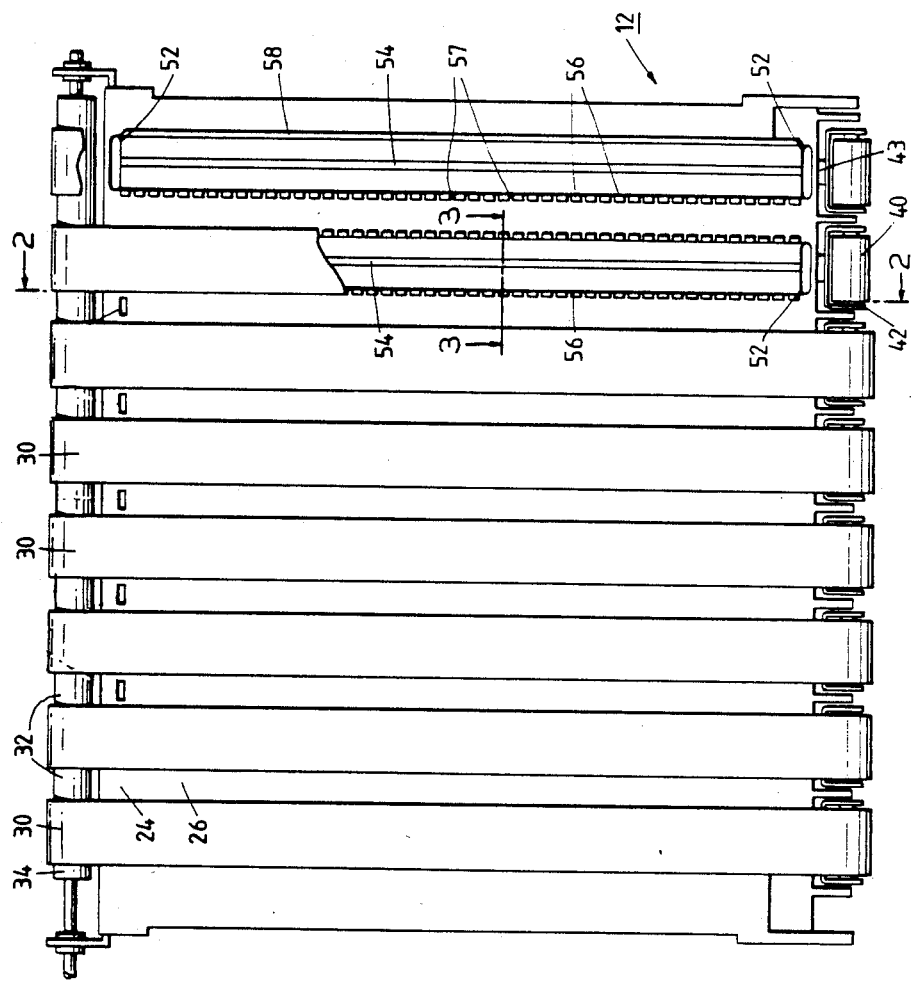
FIG. 1 is a partially cut-away bottom view of a vacuum platen transport system for a document feeder in accordance with the present invention.

The belts 30, the gaps 32 there between, and the underlying surface 26 of the vacuum plenum preferably extend over the whole area of the platen 14 and the area of the platen 14 is sufficiently large that most standard size documents will occupy only a portion of the entire platen area. This provides not only for the transporting of a wide variety of document sized, but also for a wide range of reduction imaging of documents, wherein large areas of the platen outside the document area may also be copied.

Vacuum is applied to the document in the transport system 12 from the gaps 32 between the belts as discussed in more detail below. The applied vacuum holds the document sheet against the belts 30 with sufficient force that the low friction engagement of the movement of the moving belts 30 against such vacuum-retained documents provides and adequate transporting force: that is, sufficient normal force between the paper sheet and the belts such that even with the low coefficient of friction of the belts there is sufficient forward transporting force to reliable transport the document with minimal slippage from the initial engagement of the documents upstream of the platen, then across the platen to the downstream edge thereof, i.e. toward and into the registration position 18, and then to eject the document from the platen after it had been registered and copied. The applied vacuum also helps to retain or lift up the belts 30 and the document sheet thereon out of substantial engagement with the platen 14, thereby reducing frictional resistance to feeding and static electricity generation between the document or belts and the platen.

Preferably the entire transport system 12 is based on a single monolithic white plastic molding which forms the entire vacuum plenum 24, including the surface 26 and protrusions 56, and also has formed at the ends thereof the mounting members for the rollers driving and supporting the belts, and for other components as described below.

As shown in FIGS. 1 and 2, the opposite ends if each belt loop are mounted on rollers at opposite ends of the platen transport system 12, outside the platen area. All of the belts are commonly held in the same relative position at one end thereof on the common driven roller 34. However, it may be seen that the opposite end of each belt is independently supported on individual pivotal rollers 40, as shown in FIG. 2. Each of these rollers 40 is freely rotatable about its own cylindrical axis. Each roller 40 is rotatable mounted between the extending arms of a yoke 42. Each yoke 42 has a central mounting shaft 43, spring loading it outwardly to independently tension each belt 30 by the outward force applied to the roller 40. This mounting shaft 43 is itself rotatable about its own axis, which is an axis perpendicular to the axis of rotation of the rollers 40. This allows each roller 40, and therefore the belt thereon, to tilt slightly in either direction relative to the plane of the surface 26 and therefore relative to the normal plane of the belt 30. This provides a desirable self-tracking or alignment of each belt 30. In addition, the extending arms of the yoke 42 between which the roller is mounted provide edge flanges which limits lateral travel of the belt and prevent the belt escaping from either end of roller 40.

Turning now to the vacuum system for the platen transport system 12, the vacuum source may be provided by a conventional but very low pressure fan, blower, or pump (not shown but conventional in the art). Preferably the vacuum source is pneumatically connected to one side (the rear end) of vacuum plenum 24. A very low level of partial vacuum may be applied, for example in the order of 8 mm of water or less. To operatively communicate this vacuum for document transporting, it must be be provided between the document and the backing surface 26. With the present system, this is accomplished without any vacuum apertures in the manifold surface 26 anywhere overlying the platen 14. The only apertures at all in the imaging surface 26 are vacuum apertures 52 located along the opposite (input and output) edges of the transport system 12 outside the area of the surface 26 covering the platen 14. These vacuum apertures are located at opposite ends of respective elongate vacuum channels 54 in the plenum 24 backing surface 26. The channels 54 have a flat-bottomed V-shape and extend directly below the lower flights of the belts 30 as can be seen most clearly in FIG. 3. The edges of the belts ride on protrusions 56 at opposite edges of the vacuum channels 54, as mentioned previously.

The channels 54 are suitably approximately 3 mm deep and 21 mm wide at the widest point tapering to approximately 3 mm at the bottom. The side walls of the channels are sloped, for example by 32°, with respect to the horizontal (angle of depression). The channels 54 (except for the outermost channels) are flanked on each side by a respective row of bumps or protrusions 56 formed integrally with the backing surface 26. These bumps or protrusions suitable have a substantially rectangular cross-section in the plane parallel to the backing surface 26 and protrude approximately 0.5 mm above the general level of the backing surface 25. Laterally, the bumps or protrusions 56 may be 4 mm long in the direction parallel to the movement of the belts and 2.5 mm in the transverse direction. Adjacent bumps may be spaced apart by 2 mm, yielding a pitch of 6 mm. Suitably, there may be seventy such bumps in each row although, for the sake of clarity fewer bumps are shown in FIG. 1. The belts 30 ride over the pairs of rows of bumps 56 associated with each channel 54 with the edges of the belts substantially aligned with the external edges of the bumps 56, although the belts alternatively may slightly overhang the bumps, for example by 1.5 mm. Although the channels 54 are relatively shallow, they have sufficient cross sectional area to conduct the requisite air flow with relatively low resistance, and thereby to apply the same vacuum level substantially uniformly along the entire channel length. The interstices 57 between the bumps 56 provide relatively wide openings (2 mm) from beneath the belts 30 to the inter-belt 32 so that the partial vacuum obtaining in the channels 54 may extend into the inter-belt gaps 32 over the full length of the channels 54, that is to say, over substantially the whole platen area.

As far as the two outermost channels 54 are concerned, rows of discrete bumps 56 are provided on the internal edge only, whereas a respective continuous ridge 58, the same height, i.e. 0.5 mm, as the bumps 56, is provided the full length of the channels 54 so that the outer edges of the outer belts 30 pneumatically seal against these ridges 58 to maintain a uniform reduced pressure even towards the edges of the transport system. For further details of an exemplary plural belt document feeder with which the present invention maybe practical. Reference is made to U.S. Pat. No. 4,825,255 and assigned to the same assignee as the present invention.

Figure 4:
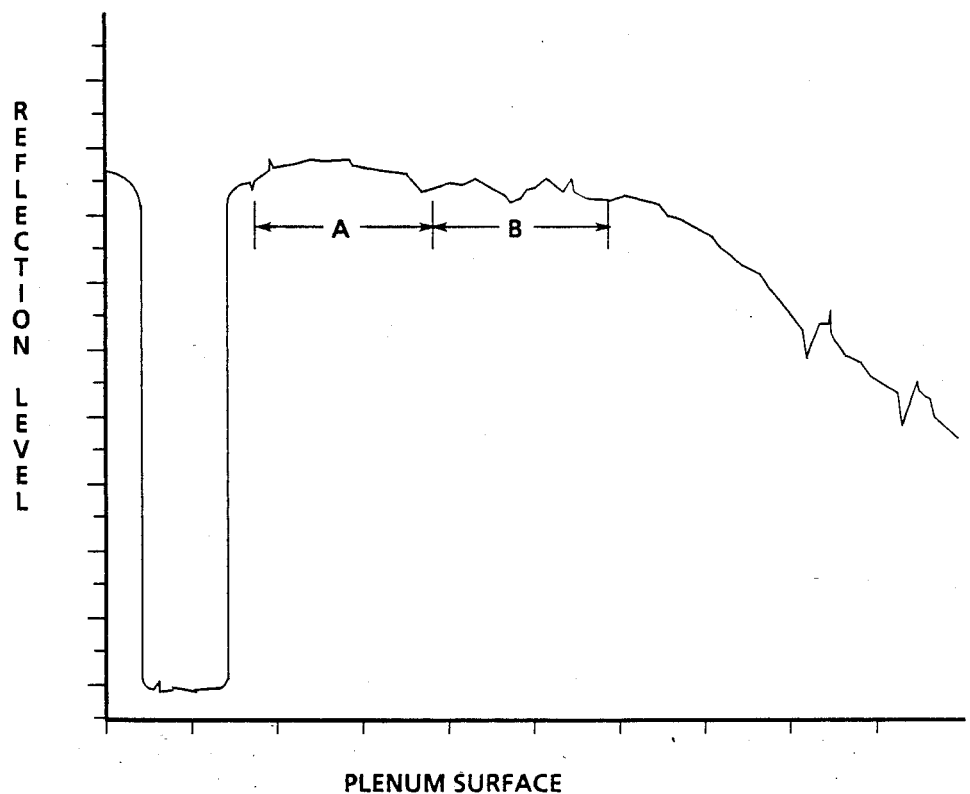
FIG. 4 is a plot showing the improvement in "show-around" produced by the optimizing of the transport system according to the present invention.
Figure 5:
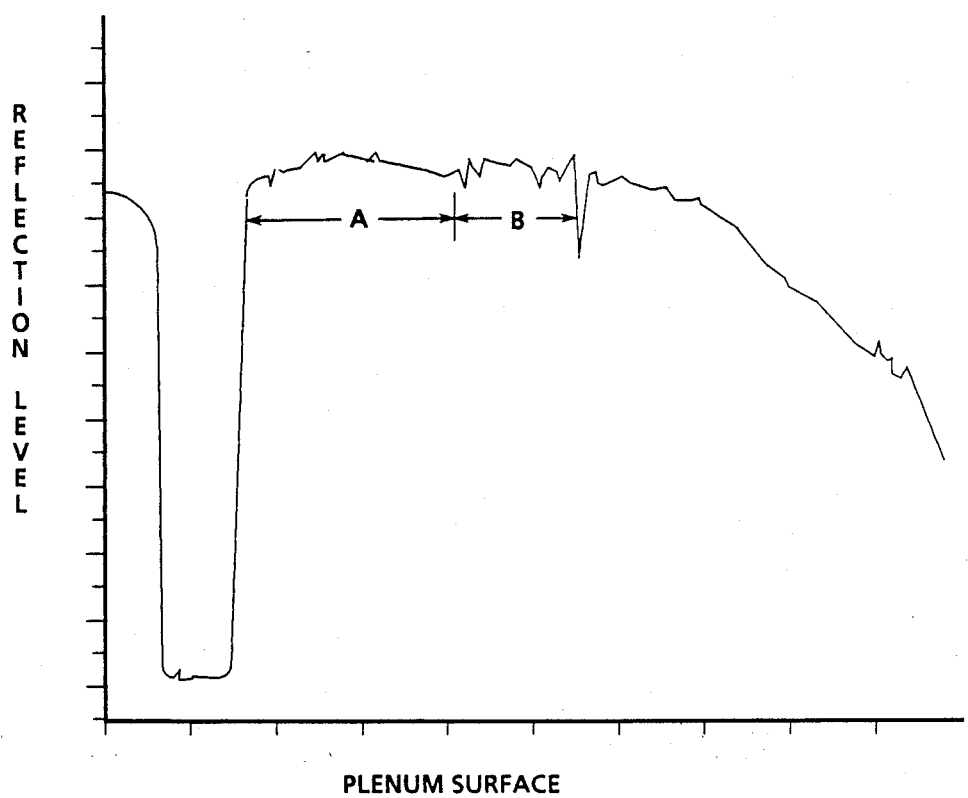
FIG. 5 is a plot showing the improvement in "show-through" by optimizing of the transport system according to the present invention.

Turning now to the features of the invention directed towards the problem of nonuniform copies caused by belt edge shadows and different effective belt and plenum reflectances which result in copy defects for undersized documents ("show-around") as well as the problems with "show-through" when copying light weight documents, it has been found that an optimum set of optical properties exist for the plenum 24 and belt 30 which synergistically improve "show-around" and eliminate "show-through". The plenum surface 26 has been roughened by a factor AA=3.6 microns. This degree of surface roughness has proven effective in scattering light via the channels 54 so that some light penetrates under the slightly overhanging belt edges. The belt, while riding on the plenum, is approximately 91% reflective to the exposing light source while having an optimum transmittance of 16%. The optimum plenum reflectance has been found to be 92%. For a preferred embodiment, a polycarbonate plenum loaded with 20% T$_i$O$_2$ was formed in a mold providing a 3.5 micron average surface average roughness was used with urethane belts. From FIG. 3, it is seen that the "show-through" problem is effectively eliminated since light passing through the document onto groove 32 is diffused in the channels 54 to eliminate shadows and cause the belt to uniformly reflect the light, whether the belt is backed by the a portion of the plemun 56 or the air channel 54. Also the belts should have about the same reflectance as the plenum. In the "show-around" case, the illumination is up though the glass platen 14 and through the belts 30 to the white reflecting backing surface 26 therebehind, and then back down through the belts 30 and the platen 14 to the imaging system of the copier. The effective reflectance of this configuration will adequately discharge the photoreceptor to essentially the same voltage as the non-belt area. This system is designed to be effectively invisible to any of the various conventional copier imaging systems, including "flash" illumination of the entire document or "scanning 38 or "slit illumination" systems etc., variously known to those skilled in the art. FIGS. 4 and 5 represent tests exhibiting improvement of document "show-through" (FIG. 4) and "show-around" (FIG. 5). FIG. 4 represents a reflectance of a Tappi 58 paper document measuring the effects of any "show-through" over the belt (area A) or the grooves (area B). The plot shows an essentially level plot across the range. FIG. 5 shows the measurements in the same area for "show-around". Again, "show-around 38 , which would be manifested by significant reductions in light level, has been effectively eliminated.

While the embodiments disclosed herein are preferred, it will be appreciated from this teaching that various alternatives, modifications, variations or improvements therein, may be made by those skilled in the art. For example, although the plenum backing surface 26, in the preferred embodiment, had the protrusions 56 provided over the surface, conventional belts such as those disclosed in the aforementioned Silverberg patent may be used. All such alternatives of modifications are intended to be encompassed by the following claims:

We claim:

1. A document feeder for conveying document sheets into and away from an imaging position on a platen of a copier, including a vacuum belt transport system which comprises:

a plurality of spaced-apart belts moving between a plenum having a white backing surface and the platen, and a vacuum source for applying a partial vacuum to the inter-belt gaps to hold a document sheet against said belts so that the document is conveyed with the movement of the belts, characterized in that the plenum backing surface has a reflectance of approximately 92% and a surface roughness of approximately 3.6 microns and said belts, when backed by the plenum, have a reflectance of approximately 91%.

2. A document feeder as claimed on claim 1, wherein said belt has a transmittance of approximately 16%.

3. A document feeder as claimed in claim 1 wherein said plenum comprises a polycarbonate loaded with 20% TiO$_2$.

* * * * *